United States Patent
Dunn et al.

(10) Patent No.: US 11,182,463 B2
(45) Date of Patent: Nov. 23, 2021

(54) METHOD TO CREATE A TRUSTED POOL OF DEVICES

(71) Applicant: SAFENET CANADA INC., Ottawa (CA)

(72) Inventors: Christopher Dunn, Ottawa (CA); Leonardo Ladeira, Ottawa (CA)

(73) Assignee: THALES DIS CPL CANADA INC., Ontario (CA)

( * ) Notice: Subject to any disclaimer, the term of this patent is extended or adjusted under 35 U.S.C. 154(b) by 263 days.

(21) Appl. No.: 16/464,286

(22) PCT Filed: Dec. 5, 2017

(86) PCT No.: PCT/CA2017/051467
§ 371 (c)(1),
(2) Date: May 27, 2019

(87) PCT Pub. No.: WO2018/102917
PCT Pub. Date: Jun. 14, 2018

(65) Prior Publication Data
US 2020/0285728 A1 Sep. 10, 2020

(30) Foreign Application Priority Data
Dec. 6, 2016 (EP) .................................... 16202333

(51) Int. Cl.
*G06F 21/33* (2013.01)
*G06F 21/60* (2013.01)
*G06F 21/72* (2013.01)

(52) U.S. Cl.
CPC .......... *G06F 21/335* (2013.01); *G06F 21/602* (2013.01); *G06F 21/725* (2013.01);
(Continued)

(58) Field of Classification Search
None
See application file for complete search history.

(56) References Cited

U.S. PATENT DOCUMENTS 7,949,032 B1 * 5/2011 Frost ................ H04W 12/041
375/140
2009/0257458 A1 * 10/2009 Cui ..................... H04J 3/0632
370/503
(Continued)

FOREIGN PATENT DOCUMENTS

CN 105491656 A * 4/2016 ........ H04W 56/0005

OTHER PUBLICATIONS

Kopetz, Hermann et al., "Integration of Internal and External Clock Synchronization by the Combination of Clock-State and Clock-Rate Correction in Fault-Tolerant Distributed Systems", Proceedings of the 25th IEEE International Real-Time Systems Symposium (RTSS 2004), 11 pages. (Year: 2004).*
(Continued)

*Primary Examiner* — Michael Pyzocha
(74) *Attorney, Agent, or Firm* — The Jansson Firm; Pehr B. Jansson (57) ABSTRACT

The present invention relates to a method to create, by a service provider, a trusted pool of security devices adapted to perform cryptographic operations in a secure service, comprising the steps of: for a service provider, setting up a secure service by allocating a first device in the service, setting the first security device's clock to a reliable time source, creating an internal secure-service-object defining at least a service clock-instance and service-specific cryptographic keys and certificates used to protect communication between a resource owner's security application and a security device part of the secure service, said secure-service-object being maintained by the security device internally preventing any service provider from arbitrarily changing it, when additional security devices are required, for the service provider, adding additional security devices to the service through ensuring the two security devices' clocks are synchronized by setting the target security device's clock to
(Continued)

an accurate time value and defining, in the secure-service-object, a max-delta-time and a max-daily-correction per day values limiting the drift between two devices of the pool.

14 Claims, 3 Drawing Sheets

(52) U.S. Cl.
CPC .............. *G06F 2221/2115* (2013.01); *G06F 2221/2151* (2013.01)

(56) References Cited

U.S. PATENT DOCUMENTS

| | | | |
|---|---|---|---|
| 2011/0066297 A1* | 3/2011 | Saberi | F16K 31/046 |
| | | | 700/287 |
| 2012/0111089 A1* | 5/2012 | Martin | B60C 23/0408 |
| | | | 73/1.42 |
| 2013/0339742 A1* | 12/2013 | Ignatchenko | H04L 9/3247 |
| | | | 713/176 |
| 2015/0256332 A1 | 9/2015 | Raj et al. | |
| 2015/0295720 A1* | 10/2015 | Buldas | H04L 9/3263 |
| | | | 713/176 |
| 2016/0044035 A1 | 2/2016 | Huang | |
| 2017/0206715 A1* | 7/2017 | Feuillette | G06Q 20/085 |
| 2018/0004916 A1* | 1/2018 | Heikkila | G16H 40/67 |

OTHER PUBLICATIONS

PCT/CA2017/051467, International Search Report, dated Feb. 16, 2018, Canadian Intellectual Property Office, Pace du Portage 1, C114—1st Floor, Box PCT, 50 Victoria Street, Gatineau, Quebac, K1A 0C9, Canada.

PCT/CA2017/051467, Written Opinion of the International Searching Authority, dated Feb. 16,2 018, Canadian Intellectual Property Office, Place du Portage 1, C114—1st Floor, Box PCT, 50 Victoria Street, Gatineau, Quebec, K1A 0C9, Canada.

* cited by examiner

METHOD TO CREATE A TRUSTED POOL OF DEVICES

FIELD OF THE INVENTION

The present invention relates to a method to create, by a service provider, a trusted pool of security devices adapted to perform cryptographic operations in a secure service.

The invention also pertains to a security device implementing said method.

BACKGROUND OF THE INVENTION

Scalable based authentication schemes are heavily reliant on time. For instance, OAUTH2 tokens confirm that the identified actor successfully authenticated itself at a specific time. The token then carries authorization data with a validity period. As such, it is thus critical that protected resources have a trustworthy clock to prevent miss use of an OAUTH2 token. When the resource is managed by a cloud provider, the resource owner is forced to rely on the provider to maintain correct clocks. This creates a security risk for a customer's protected resources. Providers, or their staff, can capture access tokens and then miss use the protected resources simply by faking the host's time. This is particularly important issue when the protected resources are cryptographic keys protected by a security device, typically an HSM.

One way cloud-based HSMs provide high assurance is by preventing a provider from miss-using key material. Since HSMs ensure keys can only be used by the HSM and the HSM's functionality is rigorously controlled by the device manufacturer and the associated certification process, a key owner can be sure their keys are safe when an HSM is involved. However, for it to be practical for a provider to offer HSM-backed services, a large pool of HSMs must be capable of acting as a single resource. Also, most the HSM's access control system must further be integrated into the cloud's IAM services. This creates two related challenges: cloud based HSMs should use time-based authentication systems and a resource owner cannot be sure which device in a pool will deliver their service.

So, to make cloud based HSMs feasible without compromising the integrity of the system, the HSM must support time-based authentication schemes where integrity of time is insured. Further the fact that the resource owner is never given visibility to any individual device in the pool and/or when devices are added or removed introduces complications.

Further alternative and advantageous solutions would, accordingly, be desirable in the art.

SUMMARY OF THE INVENTION

The present invention aims at providing secure services based on the use of a secure pool of security devices, typically in a cloud environment.

The present invention is defined, in its broadest sense, as a method to create, by a service provider, a trusted pool of security devices adapted to perform cryptographic operations in a secure service, comprising the steps of:

for a service provider, setting up a secure service by allocating a first device in the service, setting the first security device's clock to a reliable time source, creating an internal secure-service-object defining at least a service clock-instance value and service-specific cryptographic keys and certificates used to protect communication between a resource owner's security application and a security device part of the secure service, said secure-service-object being maintained by the security device internally preventing any service provider from arbitrarily changing it, when additional security devices are required, for the service provider, adding additional security devices to the service through ensuring the two security devices' clocks are synchronized by setting the target security device's clock to an accurate time value and defining, in the secure-service-object, a max-delta-time and a max-daily-correction per day value limiting the drift between two devices of the pool.

The invention allows a service provider to manage by itself the HSM device's and their clocks in a cloud based secure service while giving the resource owner visibility over the accuracy and integrity of all the clocks in an entire pool of devices. A target or targeted device is a device to be added to the secure service. The invention indeed allows the service provider to set the clocks on devices in an automated fashion, but at the same time have them forced to be synchronized with every other device in the pool. It allows a resource owner to audit the correctness of all clocks in the pool at any time, including when creating new resources by adding security devices in the pool. It allows resource consumption to proceed unattended so long as the clocks are not changed within well-defined tolerances. It allows resource owners to detect and allow/deny resource use anytime a clock is changed or reset outside of an allowed tolerance. It further minimizes the number of human interactions so that a resource owner would only be involved if a catastrophic event occurred, for instance when every single device in a provider's resource world simultaneously had their clocks corrupted. The invention is unique as it allows service providers to manage the clocks of the security devices of a pool and at the same time it provides guarantees to resource owners that the clocks cannot be arbitrarily changed by more than an allowed time a day using the settled max-daily-correction per day. This prevents service providers from changing the time and replaying arbitrarily old messages. The secure-service-object which contains a max-delta-time and a max-daily-correction per day value is maintained internally by each security device. The invention is thus based on the presence of a max-delta-time and a max-daily-correction per day value in each security device of a pool to implement a particular secure service. With the invention, the clocks get technically synchronized the way they would typically using existing methods (using something like NTP or any clock maintenance method). The invention comes from the fact that the service providers themselves monitor the clocks while creating a service but that a maximum modification is authorized by any security device where the secure service is implemented. It enables resource owners to check the genuineness of any security device as belonging to the right pool of devices implementing the secure service. Once the service created, the service providers do not have any way to modify the synchronization of any security device as they do not have any mean to modify the content of any one of the secure-service-objects as stored in any security device, the secure-service-object being maintained by each security device. Thus the presence of a max-delta-time and a max-daily-correction per day value in a secure-service-object created and maintained in a security device where the secure service was previously implemented insures any resource owner using the secure service to be in relation with a security device implementing validly the secure service. Essential features are the presence of the secure-service-object on-board any security device implementing the secure service and that this secure-service-object includes at least a max-delta-time and a max-daily-correction per day value.

Any service provider can thus make a security device to create a secure-service-object which is then fully maintained in this security device and then potentially transferred to other security devices to implement the secure service. This secure-service-object as defined in the invention is necessary and sufficient to keep control on a synchronization performed besides. The use of the max-delta-time and a max-daily-correction per day value enables the results of the invention which is a control on any drift of the clock of any one of the security device.

In the invention, the resource owner's application typically obtains the service-specific communication certificates first, and then uses it to protect all its requests so that only security devices that have the private service-specific cryptographic keys can decrypt requests and issue signed responses.

Historically security devices like HSMs do not use time as a security relevant element for authentication. Also historically all management of HSMs has stayed under the control of the Security Officer roles, so there has been no way to separate out most of the non-security relevant physical and logical device management from the security relevant operations.

This invention allows the management of the devices to be handled by untrusted service providers, such as an IaaS/PaaS public cloud provider, in a manner that allows third-party customers, such as cloud provider tenants, to trust the service. This invention defines a method for third-party customers to query for the clock value of one of the security devices part of a secure service and have assurance that the clock value of all other security devices part of the same secure service is synchronized. The invention also allows the provider to substitute additional copies of the devices, for instance to grow the service, replace failed units, and so on, in a manner that the consumer does not need to be involved, but still keeps control of their service/keys. That is, the consumer can confirm that whichever device delivers their service, its clock must be synchronized to the same device that created their service.

According to an advantageous feature, the protected secure-service-object includes a service initiation timestamp of when the secure service was created.

Advantageously, the protected secure-service-object includes a randomly generated clock-instance value.

Advantageously, the protected secure-service-object also includes randomly generated service-specific cryptographic keys and corresponding certificates.

The service-specific cryptographic keys and certificates are used to protect the communication between a resource owner's application and a security device, so that only devices that have the service-specific cryptographic keys can decrypt incoming requests and issue secure responses back to applications.

Those three values are securely shared between security devices so that only authorized devices that have synchronized clocks have the same values. This way, when customers trust a clock-instance, they indirectly trust a pool of devices that share that clock-instance. Those values defines the service's state.

According to a particular feature, the method comprises, at any time, for a consumer of the secure service, the step of requesting a secure message including the current clock settings of a security device part of the service.

This embodiment enables periodic and/or regular verification of the current clock value of security devices in the pool.

According to another particular feature, the method further comprises, at any time, for a consumer of the secure service, the step of requesting a secure message including the clock-instance of a security device part of the service.

This reinforces the periodic or regular verification of the clock-instance of security devices in the pool.

The application of a resource owner then trusts the clock instance of any device that belongs to the service and the firmware makes sure of two things: all devices of the service have the same clock and clock-instance and devices reject requests that have a clock-instance different than the one configured on the device.

With the two last features, a customer, resource owner, can advantageously decide to trust a security device's clock-instance by comparing the value of the device's clock with an accurate external time source. By further checking the clock instance value, the security is reinforced.

According to a specific implementation, said method comprises, when an additional security device is required, the steps of collecting at a security device already activated for the secure service, a signed join request from the targeted security device including a snapshot of the targeted security device's clock and allocating the targeted security device to the secure service only if the clock's snapshot respects a max-delta-time.

This implementation enables to insert new security devices while insuring the synchronization of its clock with the ones of the devices in the pool.

Advantageously, the step of allocation of the targeted security device comprises, for the security device already allocated to the secure service, the step of sending a signed answer comprising the secure-service-object to the targeted security device.

The sending of the secure-service-object enables to bind the different security devices to the same object. If this object is unknown by a device, it will not be able to handle service requests.

According to a further feature, the method comprises, when cryptographic operations of a secure service are requested to be performed by a security device part of a service, for a requesting security application of a resource owner, the steps of querying at least the current time and a service clock-instance of a security device part of that secure service, collecting an answer from the security device including a snapshot of the security device's clock and its corresponding service clock-instance, comparing the obtained security device's clock with an accurate time source, trusting the device's clock-instance if the device's clock matches the accurate time source, including the trusted clock-instance as received in subsequent requests for the secure service, having security devices only accept requests that have the same clock-instance as the clock-instance on the device's secure-service-object.

This feature insures that any sensitive operation to be performed for the service can be submitted to a previous checking of the clock synchronicity of the security devices that can perform the operation. This feature also provides assurance for the resource owner that only devices with proper clock settings are authorized to perform the secure service. The application sends requests to any security device part of the service and relies on the security device to process service requests only if the service clock-instance sent by the application is correct. With this feature the request for the secure service includes the service clock-instance value as previously received from a trusted security device and the service is performed at a security device only if this service clock-instance corresponds to the one stored in this security device at the time of the service request. There is no need for the application, according to the invention, to target a specific security device. Indeed this situation is the source of the invention as an application of a resource owner cannot know which security device of the secure service will handle the request. Indeed only the service provider controls the security devices.

According to an advantageous feature, policies are further included in the secure-service object, those policies further controlling how much security devices' clocks can be changed without requiring authorization from the service provider and/or before becoming deactivated and unable to handle service requests.

This feature protects the service provider from unauthorized applications to perform modifications to their security device's clocks which would impact end customers. Policies indeed control how much a device's clock can be changed before it gets deactivated. Without this important feature, service providers could change the clock of a security device after it joined the pool. Policies thus advantageously control how much clocks can be changed without the service providers involvement and also, in relation with a Max Daily Correction value, control how much a service provider can update the clock without deactivating the device. The threshold can be a maximum number of times or a maximal offset.

The present invention also relates to a security device adapted to belong to a pool of security devices adapted to perform cryptographic operations in a secure service, said security device having a firmware supporting time-based authentication schemes to enable a resource owner and its security application to check the integrity of the pool and a secure service provider to manage the pool of security devices, said firmware setting the target security device's clock to an accurate time value and defining a max-delta-time and a max-daily-correction per day value limiting the drift between two devices of the pool, said firmware being further able to receive and process signed join request from any security device including a snapshot of this security device's clock and to compare it with its own time value using the max-delta-time and the max-daily-correction per day value.

Such a security device is the basic entity to constitute a secure service according to the invention.

The invention also relates to a trusted pool of security devices according to the invention, said trusted pool implementing a secure service, said security devices of the trusted pool sharing the same secure-service-object, the first device allocated in the pool being responsible to create a secure-service-object and other security devices that join the pool receiving a copy of the secure-service-object using join requests of a secure protocol between security devices, said secure-service-object containing at least a service clock-instance and service-specific cryptographic keys and certificates used to protect communication between a resource owner's security application and any security device part of the service.

In the invention, the resource owner's application typically obtains the service-specific communication certificates first, and then uses it to protect all its requests so that only security devices that have the private service-specific cryptographic keys can decrypt requests and issue signed responses.

To the accomplishment of the foregoing and related ends, one or more embodiments comprise the features hereinafter fully described and particularly pointed out in the claims.

BRIEF DESCRIPTION OF THE DRAWINGS

The following description and the annexed drawings set forth in detail certain illustrative aspects and are indicative of but a few of the various ways in which the principles of the embodiments may be employed. Other advantages and novel features will become apparent from the following detailed description when considered in conjunction with the drawings and the disclosed embodiments are intended to include all such aspects and their equivalents.

DETAILED DESCRIPTION OF EMBODIMENTS OF THE INVENTION

For a more complete understanding of the invention, the invention will now be described in detail with reference to the accompanying drawing. The detailed description will illustrate and describe what is considered as a preferred embodiment of the invention. It should of course be understood that various modifications and changes in form or detail could readily be made without departing from the spirit of the invention. It is therefore intended that the invention may not be limited to the exact form and detail shown and described herein, nor to anything less than the whole of the invention disclosed herein and as claimed hereinafter. The same elements have been designated with the same references in the different drawings. For clarity, only those elements and steps which are useful to the understanding of the present invention have been shown in the drawings and will be described.

Figure 1:
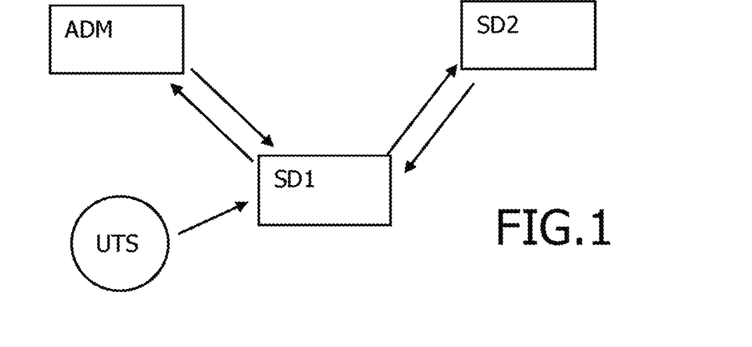
FIG. 1 schematically represents the context of the invention.

FIG. 1 shows the context in which the invention stands. A secure service is intended to be proposed to users by a service administrator ADM of a service provider. For this service to be implemented, the administrator ADM, who is a person at a service provider premises, needs to securely operate security devices SD. The invention uses an accurate but unsecure time source UTS.

Figure 2:
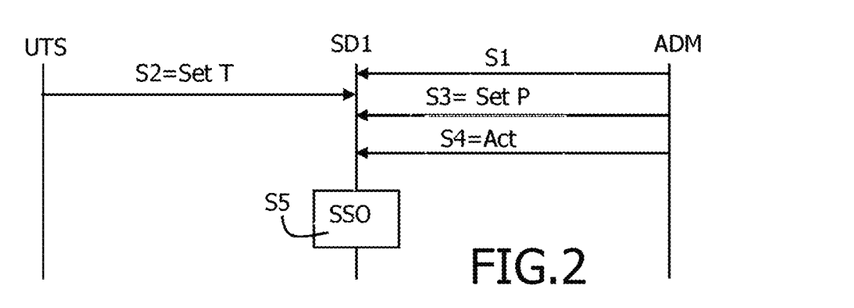
FIG. 2 shows a time-sequence diagram of the creation of a secure service according to the method of the invention.

FIG. 2 shows how a service is created according to the invention. Firstly, in a step S1, an administrator ADM of a secure service contacts a security device SD1 in order to start the constitution of the secure service. It requires the security device SD1 to set its clock in a step S2 using a time T as provided by a reliable time source UTS.

The service provider ADM thus sets up a secure service by allocating the first device SD1 in the secure service by pushing service policy P in a step S3 once its clock is set to a reliable time source UTS. The service is then activated in a step S4.

This leads to the creation of a secure-service-object SSO in a step S5. The internal secure-service-object SSO defines the service's state and, advantageously, policies. This results, for the service provider, in the creation of the secure service on this security device SD1. The service's state advantageously includes a timestamp of when the service was created, a randomly generated clock-instance-value and service-specific cryptographic keys and certificates in the data in the secure-service-object SSO. The secure-service-object SSO policies include a max-delta-time value MDT and a max-daily-correction value MDC. The secure-service-object SSO is maintained by the security device SD1 internally in a manner that prevents any entity, person or application from arbitrarily changing.

Figure 3:
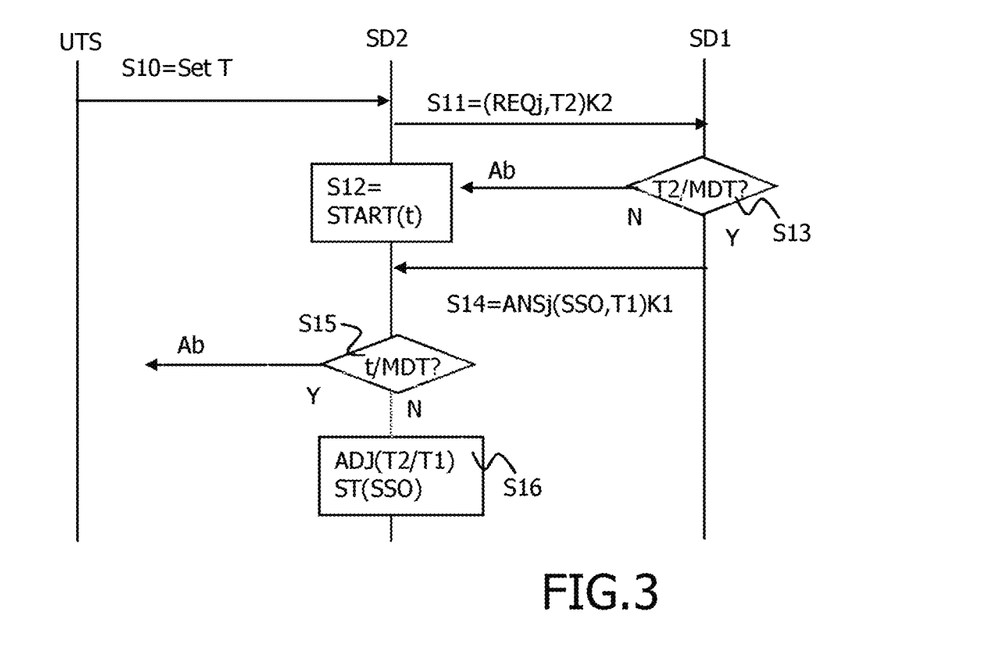
FIG. 3 shows a time-sequence diagram of the registration of a new security device for the secure service.

FIG. 3 schematically shows the process to add a security device SD2 to the secure service. The service provider administrator ADM adds additional security devices SD2 to the service through a process that ensures the two device's clocks are synchronized. For this purpose, the service provider ADM previously defines, in a service policy, a max-delta-time MDT and a max-daily-correction per day MDC value that limits the drift between two devices.

Then, as shown on FIG. 3, the security device SD2 to be added sets its clock to the accurate untrusted time value UTS in a first step S10. Then, in a step S11, the security device SD2 sends a snapshot of its clock T2 in a signed join request (REQj(T2))K2 to another security device SD1 previously inserted in the secure service by the provider ADM.

In parallel, the security device SD2 to be added in the secure service starts a time-based-counter t in a step S12.

The join request (REQj(T2))K2 is to be delivered at the security device SD1 within a limited elapsed time. If the time T2 of the security device SD2 to be added is detected to differ from the clock of the previously inserted security device SD1 by an amount greater than the max-delta-time MDT in a step S13, the security device SDA1 rejects the request and a signal Ab to inform the requesting security device is sent to security device SD2.

If the time T2 is within the max-delta-time MDT when compared to the security device SD1 clock, the security device SD1 creates a signed response ANSj(SSO,T1)K1 that includes the secure-service-object SSO and its current time T1. This answer is sent to the security device SD2 in a step S14.

Then, in a step S15, the security device SD2 to be added verifies response signature and that its time-based-counter t has not exceeded the max-delta-time MDT as previously defined by the administrator ADM.

If the max-delta time MDT is exceeded and thus if the maximum time expired, the join request is aborted Ab. If not, the security device SD2 adjusts its time T2 to the source device's clock T1 plus ½ of its time-based-counter t to minimize error and it stores ST(SSO) the received secure-service-object SSO in a step S16.

It is here noted that the max-delta-time MDT must be small enough to prevent a provider from sequencing cycling devices in an attempt to slide them forward or backward in time at a significant rate.

Figure 4:
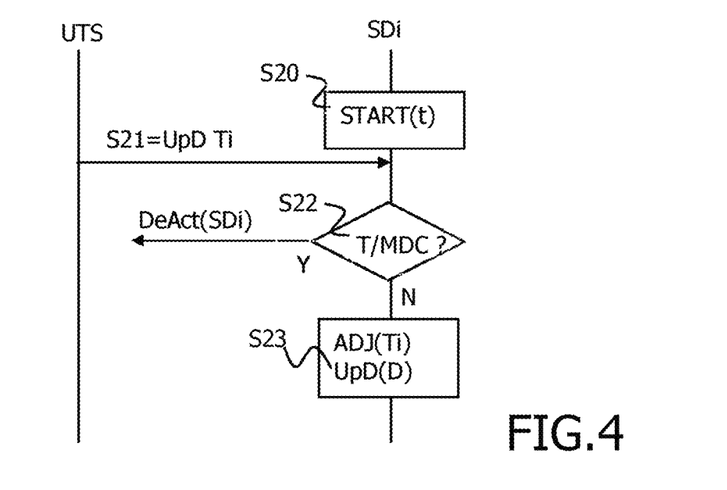
FIG. 4 shows a time-sequence diagram of the maintenance of the clock within each security device of the secure service.

FIG. 4 shows schematically how the clock is maintained according to the invention. Indeed, once a security device SDi is operating in a secure service with a synchronized clock, the security device's firmware allows a local service to periodically adjust its clock Ti, but only within the max-daily-correction value. This value is set to prevent clock Ti from sliding more than a few minutes off real time over a very long period, for instance 10 years.

The clock maintenance process starts with a first step S20 where the security device SDi starts a timer t. This timer t is used to check that no abnormal time drift occurs. Then, in a step S21, it updates UpD its clock Ti to an accurate untrusted time T source UTS. Then the device's firmware checks if the cumulative delta for the day exceeds the max-daily-correction MDC as defined in the policy in a step S22. If the max-daily-correction MDC is exceeded, the security device is de-activated DeAct for the secure service. Otherwise, the firmware adjusts ADJ the clock Ti of the security device SDi and updates UpD cumulative daily delta D in a step S23.

Figure 5:
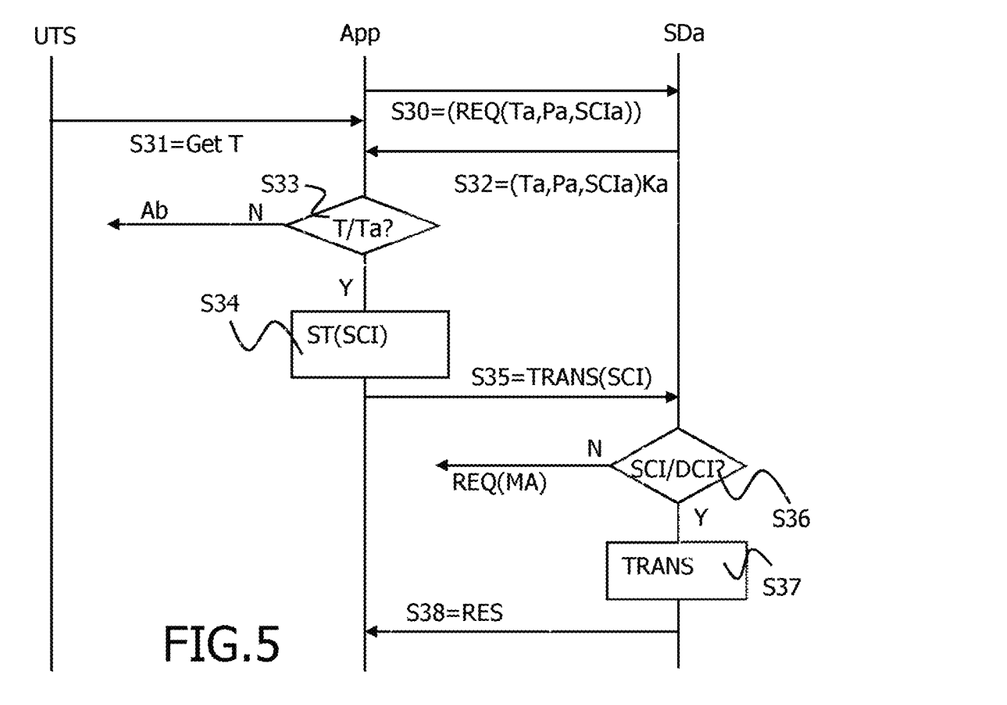
FIG. 5 shows a time-sequence diagram of a resource owner consumption.

FIG. 5 schematically shows message exchanges for a resource owner, typically a security application, to consume service from the pool of devices.

Before using the secure service, a security application App of a resource owner obtains the service-specific communication certificates and further uses these certificates to protect all requests sent to the service.

Also before using the secure service, a security application App of a resource owner requests the service clock and policy configuration of a security device SDa part of the service.

Indeed, with the invention, at any time a resource owner App can confirm the service's clock by requesting a secure message (Ta,Pa,SCIa)Ka that includes a security device's current clock setting Ta and advantageously a policy Pa and advantageously a service clock-instance SCIa. It also requests the current time from an accurate untrusted time source UTS. The resource owner besides stores the service initiation timestamp and the service clock-instance values.

These values let the resource owner App verify that the service's clock is accurate to the real world. It also lets the resource owner App calculate the maximum deviation across the entire pool of devices given the age of the service and the tolerances defined in the security policy. If the clock value obtained by the service is accurate and the policies are acceptable for the resource owner App, the resource owner App determines the service is trusted and includes the obtained service clock-instance in all the subsequent requests sent to the service.

The messages received from the security device SDa are signed by a device manufacturer's key.

The consumption process comprises a first step for the security application App to send a request REQ(Ta,Pa,SCIa) for a clock Ta, policies Pa and service clock-instance SCIa to any active security device SDa in a step S30. Meanwhile it gets time T from an accurate untrusted time source UTS in a step S31. Then, after reception, in a step S32, the active security device's signed answer (Ta,Pa,SCIa)Ka including the clock Ta of the active device SDa, the security application App checks, in a step S33, the clock value T in comparison to the clock Ta received from the active security device SDa. If the time T does not match the time Ta of the security device SDa within an acceptable tolerance, the service request is aborted Ab. Otherwise if the time T corresponds to the active device clock Ta, then, the service clock-instance value SCIa is saved ST(SCI) as trusted in a step S34.

Then, when the security application App submits a transaction TRANS to the service in a step S35, this submission reaches a security device SDa activated for the secure service. The submission securely includes the service clock-instance-value SCI as previously stored. The security device SDa checks the service clock-instance value SCI in comparison with its own clock instance value DCI in a step S36. The security device SDa only performs the service if the supplied service clock-instance SCI matches the service clock-instance SCIa that the active device has in its secure-service-object SSO. This match is tested in a step S36. If it is not the case, a request REQ(MA) for manual authorization is returned to the resource owner security application App. This allows to recover the service in case of catastrophic disaster. Indeed, a resource owner can manually authorize the use of his resource on a service by a security device with a different service clock-instance-value SCI if ever it occurs. This authorization will bind the resource to the new service clock-instance-value SCI.

If the clock instances match, then the transaction TRANS is performed in a step S37 by the active security device SDa using the resource of the resource owner. Then a result RES of the transaction is returned to the resource owner security application App in a step S38.

Figure 6:
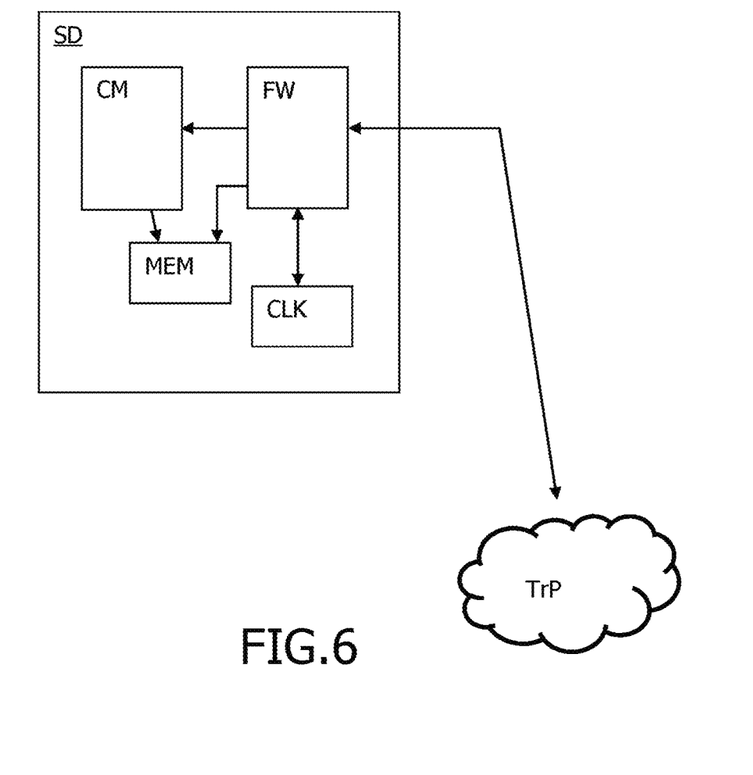
FIG. 6 shows schematically a security device of the invention.

FIG. 6 schematically shows a security device SD of the invention. This device is, indeed, a part of a trusted pool TrP schematically represented by a cloud on FIG. 6. This trusted pool TrP comprises security devices as shown and detailed on FIG. 6.

This security device SD includes a cryptography module CM able to perform cryptographic operations to be used by at least one secure service and a memory MEM to store any relevant values. It also includes a firmware FW that supports time-based authentication schemes, enables a secure service provider to manage a trusted pool of devices TrP and a resource owner to check the integrity of the clock of the pool of devices TrP. The security device further includes a clock CLK. Said firmware FW sets the security device's clock CLK to an accurate time value and defines a max-delta-time value and a max-daily-correction per day value limiting the drift between two devices of the pool TrP. The two last values are stored in memory MEM. The firmware FW is further able to receive and process any signed join request from any other security device in the trusted pool TrP including a snapshot of this security device's clock and to compare it with its own time value using the max-delta-time and the max-daily-correction per day value.

In the above detailed description, reference is made to the accompanying drawings that show, by way of illustration, specific embodiments in which the invention may be practiced. These embodiments are described in sufficient detail to enable those skilled in the art to practice the invention. The above detailed description is, therefore, not to be taken in a limiting sense, and the scope of the present invention is defined only by the appended claims, appropriately interpreted, along with the full range of equivalents to which the claims are entitled.

The invention claimed is:

1. A method to create, by a service provider, a trusted pool of security devices adapted to perform cryptographic operations in a secure service, comprising the steps of:
   for a service provider, setting up a secure service by allocating a first device in the service, setting the first security device's clock to a first time received from an external time source, creating an internal secure-service-object defining at least a service clock-instance and service-specific cryptographic keys and certificates used to protect communication between a resource owner's security application (App) and a security device part of the secure service, said secure-service-object being maintained by the security device internally preventing any service provider from arbitrarily changing it,
   when additional security devices are required, for the service provider, adding a target security device to the service through ensuring the clocks of the first and second security devices are synchronized by setting the target security device's clock to a second time value received from the external time source and defining, in the secure-service-object, a max-delta-time and a max-daily-correction per day values limiting the drift between two devices of the trusted pool.

2. The method according to claim 1, wherein the protected secure-service-object includes a service initiation timestamp of when the secure service was created.

3. The method according to claim 1, wherein protected secure-service-object includes a randomly generated clock-instance value.

4. The method according to claim 1, wherein the protected secure-service-object also includes randomly generated service-specific cryptographic keys and corresponding certificates.

5. The method according to claim 1, further comprising, at any time, for a consumer of the secure service, the step of requesting a secure message including the current clock settings of a security device part of the service.

6. The method according to claim 1, further comprising, at any time, for a consumer of the secure service, the step of requesting a secure message including the clock-instance of a security device part of the service.

7. The method according to claim 1, said method comprising, when an additional security device is required, the steps of collecting at a security device already activated for the secure service, a signed join request from the target security device including a snapshot of the target security device's clock and allocating the target security device to the secure service only if the target security device's clock's snapshot respects a max-delta-time.

8. The method according to claim 7, wherein the step of allocation of the target security device comprises, for the first security device already allocated to the secure service, the step of sending a signed answer comprising the secure-service-object to the target security device.

9. The method according to claim 1, said method further comprising, when cryptographic operations of a secure service are requested to be performed by a security device part of the service, for a requesting security application of a resource owner, the steps of querying at least the current time and a service clock instance of a security device part of that secure service, collecting an answer from the security device including a snapshot of the security device's clock and the service clock instance, comparing the obtained target security device's clock with a time value obtained from the external time source, trusting the security device's service clock-instance value if the security device's clock matches the time value obtained from the external time source, including the trusted service clock-instance value as received in subsequent requests for the secure service, having security devices only accept requests having the same clock-instance as the clock-instance on the security device's secure-service-object.

10. The method according to claim 1, wherein policies are further included in the secure-service object, those policies further controlling how much security devices' clocks can be changed without requiring authorization from the service provider and/or before becoming deactivated and unable to handle service requests.

11. A security device comprising a processor and a firmware memory, the security device adapted to belong to a trusted pool of security devices adapted to perform cryptographic operations for a secure service, said security device wherein the firmware memory contains instructions to cause the security device to support time-based authentication schemes to enable a resource owner and its security application to check the integrity of the pool and a secure service provider to manage the pool of security devices, said firmware causing the storing, by the security devices, of at least an internal secure-service-object defining at least a service clock-instance value and service-specific cryptographic keys and certificates used to protect communication between a resource owner's security application and a security device part of the secure service, setting security device's clock to a time value obtained from an external time source and defining a max-delta-time value and a max-daily-correction per day value limiting the drift between two security devices of the pool, said firmware further including instructions to cause the security device to receive and process signed join request from any other security device including a snapshot of this other security device's clock and to compare it with its own time value using the max-delta-time and the max-daily-correction per day value and to agree to the join request in case both time values fits.

12. The security device according to claim 11, wherein said firmware is further adapted to cause the security device to send the secure-service-object to a target security device once join request is agreed.

13. A trusted pool of security devices, said trusted pool implementing a secure service, said security devices of the trusted pool adapted to belong to a trusted pool of security devices adapted to perform cryptographic operations for a secure service, said security devices each comprising a processor and a firmware memory, the security device wherein the firmware memory contains instructions to cause the security device to support time-based authentication schemes to enable a resource owner and its security application to check the integrity of the pool and a secure service provider to manage the pool of security devices, said firmware causing the storing, by the security devices, of at least an internal secure-service-object defining at least a service clock-instance value and service-specific cryptographic keys and certificates used to protect communication between a resource owner's security application and a security device part of the secure service, setting security device's clock to a obtained from an external time source time value and defining a max-delta-time value and a max-daily-correction per day value limiting the drift between two security devices of the pool, said firmware further including instructions to cause the security device to receive and process signed join request from any other security device including a snapshot of this other security device's clock and to compare it with its own time value using the max-delta-time and the max-daily-correction per day value and to agree to the join request in case both time values fits; and said security devices sharing a same secure-service-object, the first device allocated in the trusted pool being responsible to create a secure-service-object and other security devices that join the trusted pool receiving a copy of the secure-service-object using join requests of a secure protocol between security devices, said secure-service-object containing at least a service clock-instance and service-specific cryptographic keys and certificates used to protect communication between a resource owner's security application and any security device part of the secure service.

14. The trusted pool according to claim 13, wherein said firmware is further adapted to cause said secure devices to send the secure-service-object to the target security device once join request is agreed.

\* \* \* \* \*